United States Patent
Bandyopadhyay et al.

(10) Patent No.: US 12,155,662 B2
(45) Date of Patent: Nov. 26, 2024

(54) TECHNIQUES FOR ADVANCED DATA ACCESS CONTROL FOR DISTRIBUTED SYSTEMS

(71) Applicant: Microsoft Technology Licensing, LLC, Redmond, WA (US)

(72) Inventors: Nikita Bandyopadhyay, Bellevue, WA (US); Seshadri Mani, Redmond, WA (US); Duane Stanley Bolick, Jr., Duvall, WA (US); Weijie Li, Bellevue, WA (US); Vladimir Vladimirovich Grebenik, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 17/406,823

(22) Filed: Aug. 19, 2021

(65) Prior Publication Data
US 2023/0055726 A1     Feb. 23, 2023

(51) Int. Cl.
*H04L 29/06*     (2006.01)
*H04L 9/40*      (2022.01)

(52) U.S. Cl.
CPC .......... *H04L 63/101* (2013.01); *H04L 63/102* (2013.01); *H04L 63/20* (2013.01)

(58) Field of Classification Search
CPC ......... H04L 63/10; H04L 63/20; H04L 63/08; H04L 63/0263; H04L 63/101; H04L 63/104
USPC .......................................................... 726/5
See application file for complete search history.

(56) References Cited

U.S. PATENT DOCUMENTS

| | | | |
|---|---|---|---|
| 9,077,728 B1 | 7/2015 | Hart et al. | |
| 9,081,981 B2 | 7/2015 | Lim | |
| 10,057,246 B1* | 8/2018 | Drozd | G06F 21/335 |
| 2002/0099952 A1 | 7/2002 | Lambert et al. | |
| 2006/0248573 A1 | 11/2006 | Pannu et al. | |
| 2021/0117561 A1 | 4/2021 | Carroll et al. | |

OTHER PUBLICATIONS

"Application as Filed in U.S. Appl. No. 17/179,151", filed Feb. 18, 2021, Feb. 18, 2021, 98 Pages.

(Continued)

*Primary Examiner* — Longbit Chai
(74) *Attorney, Agent, or Firm* — Novo TechIP International PLLC

(57) ABSTRACT

A data processing system for controlling data access to a secured resource of a distributed system implements receiving, from a first user device of a first user, a first request to access a secured resource and a first security token, the first security token including group information for one or more first access control groups associated with the secured resource of which the first user is a member; accessing group access policy information for groups associated with the secured resource; determining, based on the group information included in the first security token and the group access policy information, that the first user is a member of at least one group that is permitted to access the secured resource; and permitting the first user device of the user to access the secured resource responsive to determining that the first user is a member of at least one group that is permitted to access the secured resource.

20 Claims, 9 Drawing Sheets

(56) References Cited

OTHER PUBLICATIONS

"IBM WebSphere Commerce V7: Access Control Policy", Retrieved from: https://help.hcltechsw.com/commerce/7.0.0/com.ibm.commerce.admin.doc/concepts/caxaccesspolicy.html, Jul. 30, 2021, 5 Pages.

Plumley, et al., "Overview of Microsoft 365 Groups for Administrators", Retrieved from: https://docs.microsoft.com/en-us/microsoft-365/admin/create-groups/office-365-groups?view=o365-worldwide, Jul. 13, 2021, 5 Pages.

Wilde, et al., "Access Control for Shared Resources", In Proceedings of the International Conference on Computational Intelligence for Modelling, Control and Automation and International Conference on Intelligent Agents, Web Technologies and Internet Commerce, Dec. 2005, 6 Pages.

"International Search Report and Written Opinion Issued in PCT Application No. PCT/US22/037234", Mailed Date: Oct. 10, 2022, 12 Pages.

\* cited by examiner

TECHNIQUES FOR ADVANCED DATA ACCESS CONTROL FOR DISTRIBUTED SYSTEMS

BACKGROUND

Distributed system are computing environments in which components of the computing environment are located on different network computers. For example, distributed systems may include but are not limited to file management system, files and/or other content of a collaborative platform, a messaging system, and/or other types of resources that may be accessible to and/or manipulated by users of the distributed system. Such distributed systems may provide many users with access to a secured resource. Each of the users may have different access rights to the content of the secured resource. As the number of users and/or the amount of content managed by the distributed system increases and/or the users of the distributed system change roles that result in a change in their access rights, owners or administrators of the distributed resource may find it increasingly difficult to keep the access permissions up to date. As a result, stale access permissions may allow users who should no longer have the rights to access and/or modify content of a secured resource managed by the distributed system the ability to do so. Hence, there is a need for improved systems and methods for providing advanced access control for distributed systems.

SUMMARY

An example data processing system according to the disclosure may include a processor and a computer-readable medium storing executable instructions. The instructions when executed, cause the system to perform operations including receiving, from a first user device of a first user, a first request to access a secured resource and a first security token, the first security token including group information for one or more first access control groups associated with the secured resource of which the first user is a member: accessing group access policy information for groups associated with the secured resource, the access control policy information identifying one or more access control groups associated with the secured resource, membership in an access control group indicating that a user is permitted to access the secured resource, and membership in the access control group being independent from access control information associated with the user and indicative of how the user may interact with the secured resource upon accessing the secured resource: determining, based on the group information included in the first security token and the group access policy information, that the first user is a member of at least one group that is permitted to access the secured resource; and in response, permitting the first user device of the first user to access the secured resource.

An example method implemented in a data processing system for controlling data access to a secured resource of a distributed system according to the disclosure includes receiving, from a first user device of a first user, a first request to access the secured resource and a first security token, the first security token including group information for one or more first access control groups associated with the secured resource of which the first user is a member: accessing group access policy information for groups associated with the secured resource, the access control policy information identifying one or more access control groups associated with the secured resource, membership in an access control group indicating that a user is permitted to access the secured resource, and membership in the access control group being independent from access control information associated with the user and indicative of how the user may interact with the secured resource upon accessing the secured resource; determining, based on the group information included in the first security token and the group access policy information, that the first user is a member of at least one group that is permitted to access the secured resource; and in response, permitting the first user device of the user to access the secured resource.

An example machine-readable storage medium according to the disclosure on which are stored instructions which when executed cause a processor of a programmable device to perform operations of: receiving, from a first user device of a first user, a first request to access a secured resource and a first security token, the first security token including group information for one or more first access control groups associated with the secured resource of which the first user is a member: accessing group access policy information for groups associated with the secured resource, the access control policy information identifying one or more access control groups associated with the secured resource, membership in an access control group indicating that a user is permitted to access the secured resource, and membership in the access control group being independent from access control information associated with the user and indicative of how the user may interact with the secured resource upon accessing the secured resource: determining, based on the group information included in the first security token and the group access policy information, that the first user is a member of at least one group that is permitted to access the secured resource; and in response, permitting the first user device of the user to access the secured resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
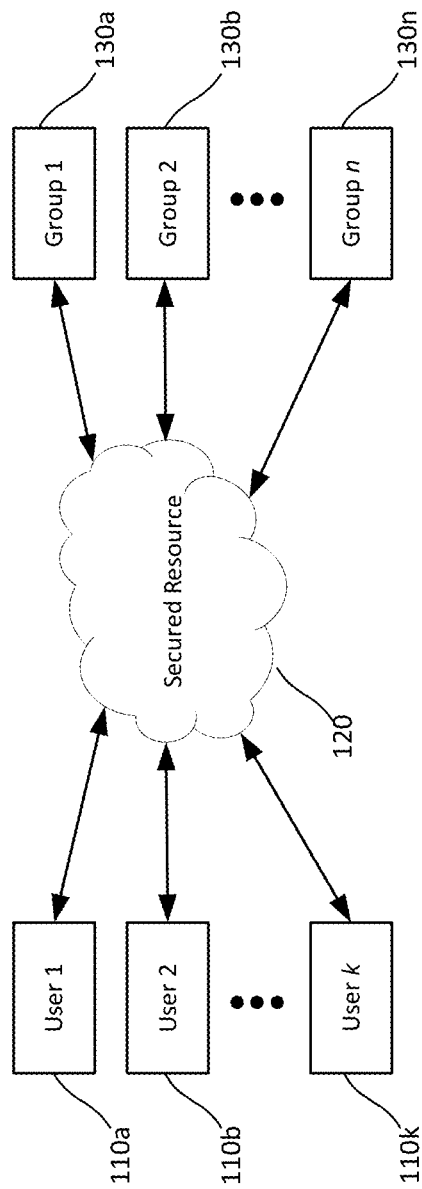
FIG. 1 is a diagram showing an example of users and groups associated with a secured resource.

In the following detailed description, numerous specific details are set forth by way of examples to provide a thorough understanding of the relevant teachings. However, it should be apparent that the present teachings may be practiced without such details. In other instances, well known methods, procedures, components, and/or circuitry have been described at a relatively high-level, without detail, to avoid unnecessarily obscuring aspects of the present teachings.

The instant disclosure describes a technical solution to the technical problem of lack of an advanced access control mechanism for distributed systems. The technical solution provides a group-level access control for distributed systems. The distributed system may provide access controls for controlling which users are able to access a secured resource managed by the distributed system. The secured resource may be various types of resources, such as but not limited to a file management system, files and/or other content of a collaborative platform, a messaging system, and/or other types of resources that may be accessible to and/or manipulated by users of the distributed system. The distributed system may be provided by a corporation, school system, university, or other organization to employees or members of the organization and/or to clients of the organization. For example, a corporation may provide employees with access to a file sharing and/or collaboration platform that allows the employees to share content and/or collaborate on various projects with other employees of the corporation. Access to the file sharing and/or collaborative platform may be limited to certain users within the corporation based on their roles within the corporation, the users' participation in certain projects, and/or other factors. The actions that the individual users may perform on the file sharing and/or collaboration platform may also be controlled at a fine level of granularity to allow users to access, add, delete, or modify specific content while preventing the users from performing similar actions on other content.

The complexity of access control management for a distributed system, such as that discussed in the preceding example, may quickly become cumbersome for administrators of the distributed system. Users' roles may change over time, and certain access control permissions may become stale in view of these changes. Owners and/or administrators of the distributed may quickly become overwhelmed in trying to stay up to date with such changes. The techniques provided herein provide an efficient and easy to use means for controlling user access to the secured resources of a distributed system. The techniques provided herein utilize a group-based policy for accessing the secured resource. The group-based access policy may be defined by the owners and/or administrators of the secured resource and may include one or more groups that are permitted to access the secured resource. Users that are associated with those groups may then be able to access the secured resource. All other users may be denied access to the secured resource. As such, access to the secured resource may be granted and/or denied to different groups. This group-based access control technique may be used to quickly and efficiently grant or revoke access to the shared resource to groups of users. A technical benefit provided by these technical solutions is that existing fine-grained access controls may be used with the group-based access control techniques. Thus, the actions of the users permitted to access the secured resource under the group-based access control policy may also be controlled at a fine-grain once the users have been granted access to the distributed system. Another technical benefit of this approach is that it provides owners and administrators with a powerful tool for managing who has access to the secured resource of a distributed system without compromising the ability to control what those who have access to the secured resource may do once these users access the secured resource. The group rosters may be updated regularly based on the policies associated with the distributed system. As a result, stale site permissions no longer present a security problem as users who are not a member of or no longer a member of one of the groups permitted to access the secured resource will not be granted access to the secured resource. These and other technical benefits of the techniques disclosed herein will be evident from the discussion of the example implementations that follow.

FIG. 1 is a diagram showing an example relationship between users 110a-110k, access control groups 130a-130n, and a secured resource 120. The secured resource 120 may be any type of secured resource provided by a distributed system, such as but not limited to those discussed in the preceding examples. The users 110a-110k may be users associated with an organization or other entity that provides the secured resource 120. Each of the users 110a-110k may be associated with one or more access control groups 130a-130n. An access control group may have one or more members, and the secured resource 120 may be associated with a group-based access policy in which members of certain groups are permitted to access the secured resource 120. An owner or administrator of the secured resource 120 may configure the group-based access policy to determine which access control groups are permitted to access the secured resource 120. The owner or administrator may also create new groups, add or remove users from access control groups, and/or remove access control groups. The removal of an access control group does not remove the users who are a member of that access control group. Furthermore, a newly created access control group may initially have no members until users are added to the group. The owner or administrator may add or revoke the access permission for an access control group at any time, providing the owner or administrator with the ability to quickly control which users may access the secured resource 120. Membership in an access control group may be used to control whether a user has access to the secured resource 120. However, the membership in the access control group does not provide the user with rights for performing actions on the secured resource 120. Once the users have access to the secured resource 120, any access control list (ACL) or other access control means associated with the individual and/or with the secured resource 120 determine which actions a user may perform on the secured resource 120. Additional details of how ACL-based control means may be used to control which actions a user may perform on the content of the secured resource are provided in the examples which follow.

Figure 2:
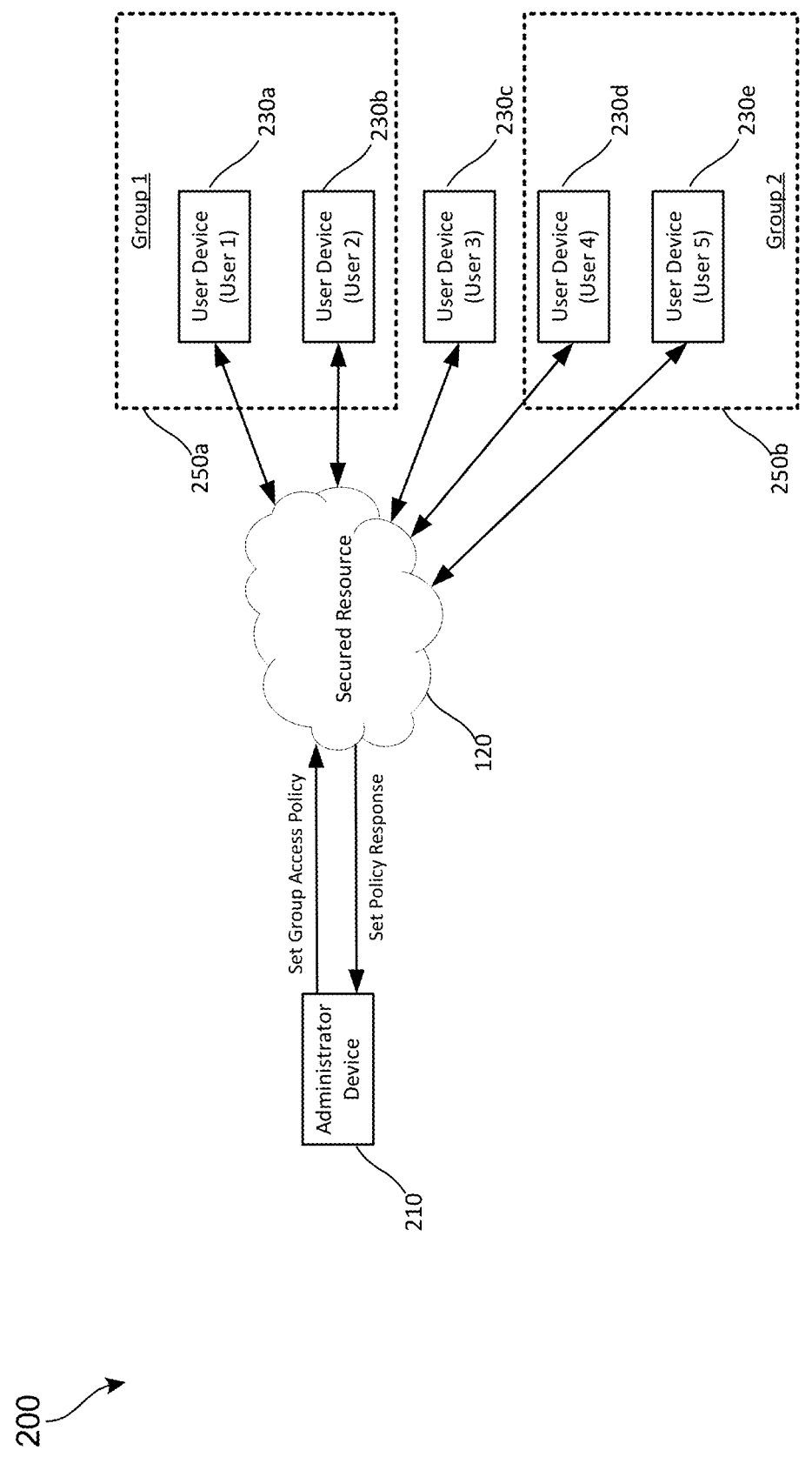
FIG. 2 is a diagram showing an example computing environment in which an administrator device sets a group access policy for a secured resource.

FIG. 2 is a diagram showing an example computing environment 200 in which an administrator device 210 and user devices 230*a*, 230*b*, 230*c*, 230*d*, and 230*e* may interact with the secured resource 120 provided by a distributed system. The administrator device 210 and the user devices 230*a*, 230*b*, 230*c*, 230*d*, and 230*e* are each a computing device that may be configured to access the secured resource 120 via a network connection. The network connection may be over one or more public and/or private networks. In some implementations, one or more of the administrator device 210 and the user devices 230*a*, 230*b*, 230*c*, 230*d*, and 230*e* may access the secured resource 120 via the Internet.

The administrator device 210 and user devices 230*a*, 230*b*, 230*c*, 230*d*, and 230*e* are each a computing device that may be implemented as a portable electronic device, such as a mobile phone, a tablet computer, a laptop computer, a portable digital assistant device, a portable game console, and/or other such devices. The user devices 105*a*, 105*b*, and 105*c* may also be implemented in computing devices having other form factors, such as a desktop computer, vehicle onboard computing system, a kiosk, a point-of-sale system, a video game console, and/or other types of computing devices. While the example implementation illustrated in FIG. 2 includes five user devices, other implementations may include a different number of user devices. The administrator device 210 may be substantially similar to that of the user devices 230*a*, 230*b*, 230*c*, 230*d*, and 230*e*, but the administrator device 210 may be used by an owner or administrator of the secure resource to configure the group-access policy for the secured resource 120, to add, modify and/or delete access control groups associated with the secured resource 120, to configure ACLs for users of the secured resource 120, and/or perform other administrative actions on the secured resource 120.

The administrator device 210 may include a native application associated with the secured resource 120. The native application may provide a user interface that provides tools for enabling the owner or administrator to configure the group access control policies for access control groups associated with the secured resource 120 and/or the ACL information associated with the users of the secured resource 120. In some implementations, a web application associated with the secured resource 120 may be provided for interacting with the secured resource 120, and the administrator device 210 may include a browser application for accessing the web application provided by the secured resource 120. Similarly, the user devices 230*a*, 230*b*, 230*c*, 230*d*, and 230*e* may each include a native application or browser application for accessing the functionality provided by the secured resource 120.

In the example shown in FIG. 2, two access control groups of users have been set up for the secured resource 120. The first access control group 250*a* includes users 1 and 2, and the second access control group 250*b* includes user 4 and 5. User 3 is not associated with any group in this example.

The owner or administrator of the secured resource 120 may set a group access policy for one or both access control groups associated with the secured resource 120. For example, the owner or administrator may set up a group access policy that indicates that the users of the first access control group 250*a* may access the secured resource 120. The administrator device 210 may send a set group access policy message to the secured resource 120, and the secured resource 120 may send a set policy response message to the administrator device 210 in response to receiving the set group access policy message. The set group access policy message may specify one or more access control groups for which access to the secured resource 120 is to be granted or revoked. The set policy response message sent by the secured resource 120 may provide an indication whether the request was completed. The set policy response message may also include an indication why a request could not be completed in instances where the group access policy information could not be updated.

To illustrate these concepts, suppose that the set group access message indicates that users of both access control groups 250*a* and 250*b* may access the secured resource 120. Users 1 and 2 of the first access control group 250*a* and users 4 and 5 of the second access control group 250*b* would then be able to access the secured resource 120 from their respective user devices. User 3 is not associated with either of these groups and would not be able to access the secured resource 120. Suppose that the owner or administrator then submits a second group access message that revokes the access of the second access control group 250*b*. Users 4 and 5 would then be no longer able to access the secured resource 120. Users 1 and 2 who are associated with the first access control group 250*a* would still be able to access the secured resource 120. Any ACLs or other access controls associated with the users 1 and 2 would still be applied to control which actions the users are permitted to perform with the secured resource 120. This example demonstrates how the group-based policy techniques provided herein may be used to efficiently control access to a secured resource, such as the secured resource 120 in an efficient and easy to use manner by controlling the access on a group level. The owner or administrator need not be concerned about stale site permissions permitting users to access and/or manipulate the secured resource 120 when the users should no longer be able to do so. Those users would simply no longer be able to access the secured resource 120 because they would no longer be associated with a group that is permitted to access the shared resource.

In addition to managing day to day access to a distributed system, these techniques may be used by an administrator or owner of a secured resource for testing of a new version of a shared software product, for providing users within a specified access control group or access control groups of users with early or premium access to the content, or other scenarios where the owner or administrator of a secured resource may grant access to an access control group of users and to quickly and efficiently revoke the access of the users once the period of testing or early access is over. The techniques provided herein are not limited to these specific example implementations and may be used in other implementations for access control of a secured resource.

Figure 3:
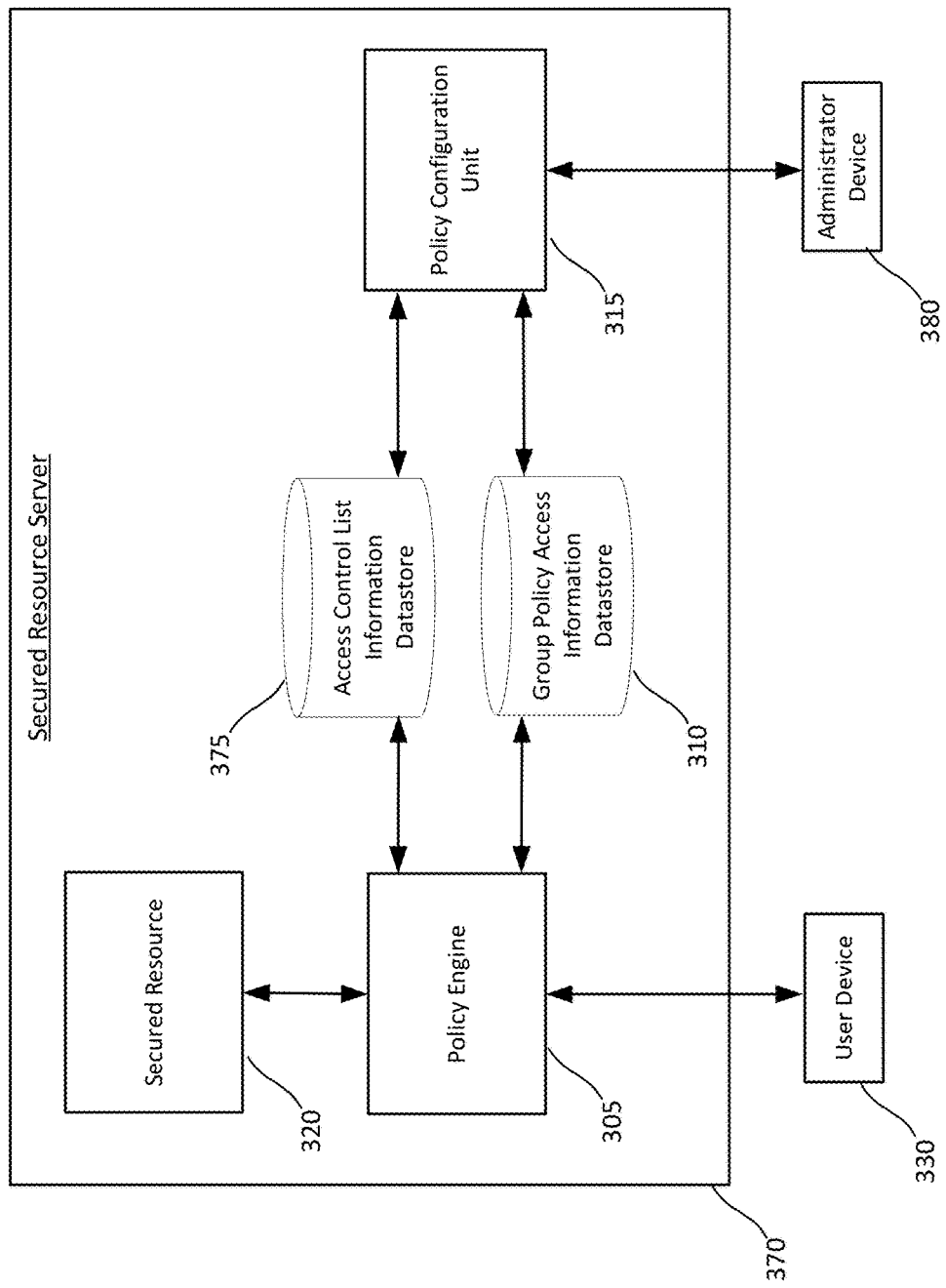
FIG. 3 is a diagram showing details of an example resource server.

In some implementations, the owner or administrator of the secured resource 120 may also add or remove users from groups. The administrator device 210 may send a set group membership request message that indicates: (1) a group identifier for an access control group, (2) a user identifier, and (3) an indication whether the user associated with the user identifier should be added or removed from the access control group associated with the group identifier. The set group membership request message is shown being sent directly to the secured resource 120 in FIG. 2. However, as shown in FIG. 3, the administrator device 210 may send the set group membership request message to a secured resource server 370) which manages the secured resource. The group information associated with the secured resource may be updated in response to receiving the set group membership request message. The group information may be maintained in a datastore associated with the secured resource 120.

FIG. 3 is a diagram of an example computing environment 300 showing details of a secured resource server 370) that may be used to implement the group-based access control techniques provided herein. The secured resource server 370 is shown as a single computing device in the example shown in FIG. 3, but the functionality of the secured resource server 370 may be implemented by multiple computing devices in other implementations. The example shown in FIG. 3 includes a single user device 330 and a single administrator device 380. However, the secured resource server 370 may interact with multiple user devices and/or administrator devices, which may be similar to those described in the preceding examples. The secured resource server 370) controls access to the secured resource 320, which may be similar to the secured resource 120 discussed in the preceding examples. The secured resource server 370) may be a cloud-based system accessible over the Internet or may be implemented as a server system implemented on a private network of an organization associated with the secured resource 320.

The secured resource server 370 may include a policy configuration unit 315. The policy configuration unit 315 may be configured to provide a means for the owner or administrator of the secured resource 320 to configure the group access control policies for groups associated with the secured resource 320 and/or the ACL information associated with the users of the secured resource 320. The administrator device 380 may send a set group access policy message to the secured resource server 370 to create a new group or modify an existing group associated with the secured resource 320. The policy configuration unit 315 may receive the set group access policy message and update the group access policy information datastore 310. As discussed in the preceding examples, the owner or administrator of the secured resource 320 may grant or revoke access to the secured resource 320 to one or more access control groups of users. The administrator device 380 may also send an ACL information message to the secured resource server 370 in which the ACL information for one or more users may be added, updated, or modified. The ACL information for a user may be configured to provide fine-grain control over the actions that a user may perform on the secured resource 320. The policy configuration unit 315 may update the ACL information datastore 375 with the information received in the message.

The policy configuration unit 315 may be configured to authenticate the user of the administrator device 380 to ensure that the user is authorized to modify the contents of the group access policy information datastore 310 and the ACL information datastore 375. In some implementations, the administrator device 380 may provide a security token to the policy configuration unit 315 that includes information that identifies the user of the administrator device 380 to the secured resource server 370 and may be used by the policy configuration unit 315 to confirm that the user has been authenticated. The security token may be implemented as a JavaScript Object Notation (JSON) web token in some implementations.

Once the policy configuration unit 315 has determined authenticated the user of the administrator device 380, the policy configuration unit 315 may determine which actions the administrator is authorized to perform. In some implementations, an owner of the secured resource 320) and/or any administrator may be permitted to modify the contents of the group access policy information datastore 310 and/or the ACL information datastore 375 associated with other users of the secured resource server 370. In other implementations, certain administrators may have limited authorization to perform modifications on the content of the group access policy information datastore 310 and the ACL information datastore 375.

The secured resource server 370 may include a policy engine 305. The policy engine 305 may be configured to: (1) determine whether a user of the user device 330 is authorized to access the secured resource 320, and (2) determine whether the user has the rights required to perform a requested action or actions on the secured resource 320, if the user has access to the to the secured resource. The user device 330 may send a request to perform an action or actions on the secured resource 320 and a security token. The policy engine 305 may analyze the request and security token to determine whether the user should be permitted to access the secured resource 320 and whether the user has the required level of access to perform the requested action on the secured resource 320.

Figure 4:
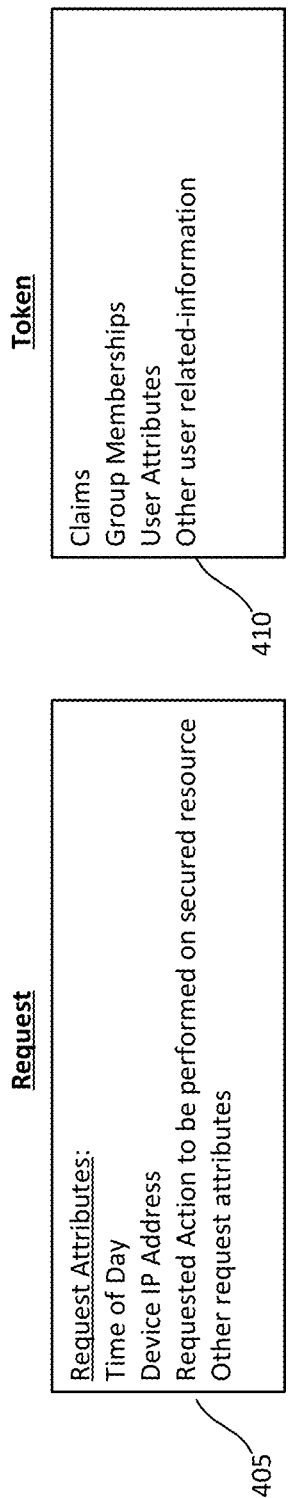
FIG. 4 is a diagram showing details of an example request and token.

FIG. 4 shows an example request 405 and token 410 that may be sent to the secured resource server 370 by the user device 330. The request 405 may indicate one or more actions that the user of the user device 330 has requested be performed on the secured resource 320. The request 405 may also include additional request attributes that may be used by the policy engine 305 to determine whether the user is authorized to access the secured resource 320. The request attributes may include information about the user device 330, such as but not limited to a network address of the user device 330, the version of the operating system or other software on the user device 330, and/or other information related to the user device 330. The request attributes may also include a timestamp indicating when the request was sent by the user device 330. The request information may also include other information associated with the request that may be used by the secured resource server 370) to determine whether the user has access to the secured resource 320.

The token 410 may be a security token provided with the request. The token 410) may be implemented as a JSON web token similar to the token provided by the administrator device 380. The security token may be generated by an authentication server or service (not shown) that verifies the identity of the of user. The token 410 may be provided to the user device 330 by the authentication server or service, and the user device 330 may provide the token 410 to the secured resource server 370 with the request to authenticate the user to the secured resource server 370).

The token 410 may include information such as but not limited to access control group memberships of the user, user attributes associated with the user, claims information, and/or other security information associated with the user. The claims information may provide assertions about the user to the secured resource server 370. For example, the claims information may include key-value pairs that relay information about the user and the token. The information included in the token may be used by the policy engine 305 to validate the token and determine whether the user has been authenticated. The claims of token 410 may include information indicating when the token 410 was generated and the security server or service that generated the token 410. The claims may also include group membership information that indicates to which access control groups associated with the secured resource 320 the user making the request 405 belongs. The information included in the token 410 may be used to determine that the user has been authenticated.

The policy engine 305 may then determine whether the user is authorized to access the secured resource 320. The policy engine 305 may determine to which access control groups, if any, the user belongs, based on the group information included in the token 410. The policy engine 305 may determine whether the user is a member of any access control groups based on the groups information included in the token 410 and the group access policy information datastore 310. If the user is not a member of any access control groups permitted to access the secured resource 320, then the user is denied access to the secured resource 320. If the user is a member of an access control group that has access to the secured resource 320, then the policy engine 305 may access the ACL information datastore 375 and determine the types of actions the user is permitted to perform on the secured resource 320, based on the ACL information, the claims and other information included in the token 410. Additional details of how the policy engine 305 may make these determinations will be discussed with respect to the examples shown in FIGS. 5 and 6.

Figure 5:
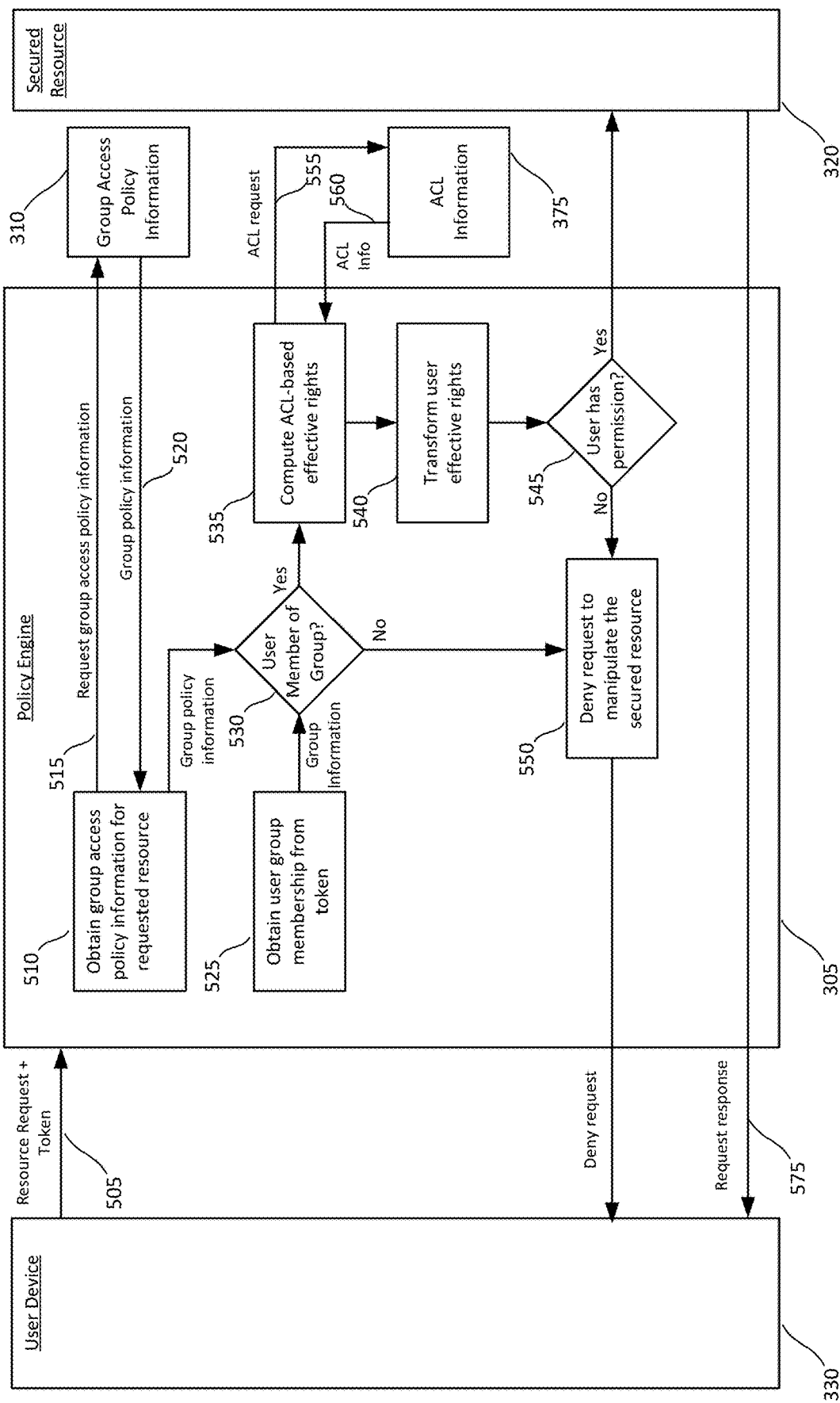
FIG. 5 is a diagram showing an example of processing a request to manipulate a secured resource.

FIG. 5 is a diagram showing additional details of operations that may be performed by the policy engine 305 of the secured resource server 370. The user device 330) may submit a resource request and a token 505 to the secured resource server 370. Upon receipt, the request may be processed by the policy engine 305 to (1) determine whether the user submitting the request is authorized to access the secured resource 320, and (2) determine whether the user has the rights required to perform a requested action or actions on the secured resource 320 if the user has access to the secured resource. The request may be similar to the request 405 shown in FIG. 4 and the token may be similar to the token 410 shown in FIG. 4. The request may indicate one or more operations requested to be performed on the secured resource 320 on behalf of the user of the user device 330.

The policy engine 305 may perform an operation 510 in which the policy engine 305 obtains group access policy information for a requested resource identified in the request received from the user device 330. The requested resource may be the secured resource 320. The policy engine 305 may formulate a request for group access policy information 515 to obtain the group access policy information 520 from the group access policy information datastore 310. The group access policy information for each of the access control groups associated with the requested resource may be provided to the policy engine 305. The group access policy information may include, for each access control group, a group identifier and an indication of whether members of the group are permitted or are not permitted to access the secured resource 320.

The policy engine 305 may perform an operation 525 of obtaining the user group membership information from the security token. The token 410 may include claim information, and the claim information may include identifiers of the groups associated with the secured resource 320 of which the user is a member.

The policy engine 305 may perform an operation 530 of determining whether the user is a member of at least one group that has been granted access to the secured resource 320 and the access has not been revoked. The policy engine 305 may make this determination by comparing the group information obtained from the token with the list of groups associated with the resource obtained from the group access policy information datastore 310. If the user is not a member of any groups or is not a member of a group that has been granted access to the secured resource, the policy engine 305 may proceed to operation 550). In operation 550, the policy engine 550 may deny the resource request 505 received from the user device 330, before generating a message indicating that the request has been denied. The message may include an indication that the user does not have access to the secured resource 320.

The policy engine 305 may proceed to operation 535 responsive to the user being authorized to access the secured resource 320. In operation 535, the policy engine 305 may compute ACL-based effective rights of the user based on the resource being requested. The ACL-based effective rights may be computed using the ACL information 560 obtained from the ACL information datastore 375. The policy engine 305 may formulate and send an ACL request 555 to obtain the ACL information 560 from the ACL information datastore 375. The secured resource 320 may include multiple resources, such as but not limited to electronic content comprising various types of files, collaboration tools for project scheduling and management, social collaboration, communications, and file sharing, other types of executable content, and/or other resources that may be managed by the secured resource server 370. The types of content provided by the secured resource 320 and managed by the secured resource server 370 depends upon the implementation and the requirements of the owners and/or users of the secured resource server 370. The objects comprising the content of the secured resource server 370 may be assigned different security protections that define the user rights to access these objects and to perform specific actions on these objects. These rights may be expressed as ACL lists associated with the objects of the secured resource 320. The ACL lists associated with the objects of the secured resource 320 may be stored in the ACL information datastore 375.

Figure 6:
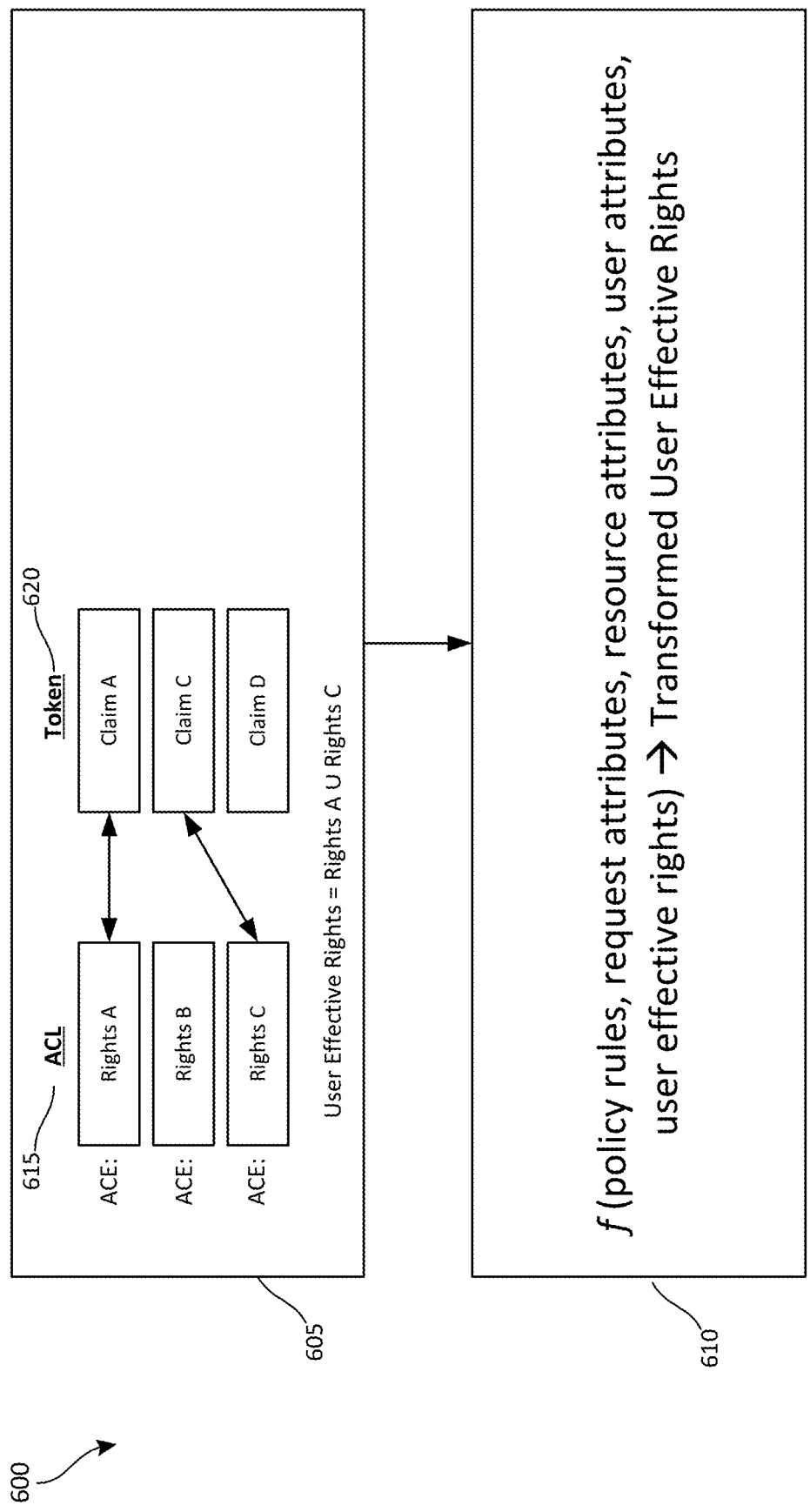
FIG. 6 is a diagram showing an example process for determining transformed user effective rights for content of the secured resource.

The policy engine may query the ACL information datastore 375 to obtain the ACL information for the object or objects associated with the request 505. The ACL is a list of access control entries (ACEs) that provide the security protections associated with the object or objects related to the request 505. An example of such an ACL 615 is shown in FIG. 6 as well as a list of claims 620 obtained from the token 410. FIG. 6 is a diagram showing an example process 600 for determining transformed user effective rights for content of the secured resource. The policy engine 305 may compare each of the claim 620 asserted by the user with the rights afforded to the user according to the ACL 615. The policy engine 305 may determine effective user rights for the user based on the results of this comparison. In the example shown in FIG. 6, the token 410 includes claims for rights A, C, and D. These claims correspond to rights A and C of the ACL for that object. The token 410 does not include a claim for rights B, and the ACL 615 does not include the rights D included in the claims 620 of token 410. Therefore, the user effective rights may be determined to be the union of Rights A and C as shown in the example of FIG. 6. Thus, the user effective rights determined by operation 605 represent the union of the rights from the ACL that have corresponding claims in the list of claims 620 from the token 410.

Referring back to FIG. 5, the policy engine 305 may perform an operation 540 of transforming the effective user rights determined in operation 535. The effective user rights determined in operation 535 may be modified based on other factors that may alter the user effective rights of the user to access the requested objects of the secured resource 320. For example, policy rules, the request attributes of the request 405, the resource attributes of the requested resource, user attributes of the token 410, and/or other factors may be used to further transform the user effective rights.

FIG. 6 shows an example operation 610 in which a transform function is applied to the policy rules, request attributes, resource attributes, and user attributes. A policy rule is a declarative expression of a resource owner or administrator's intent for access control. To illustrate this concept, an example instance of a policy rule is "A user accessing a resource having <<having Resource Attribute R>> must<<User Attribute U>> of the group <<Group Attribute G>> of the secured resource or else no rights shall be granted." The example policy rule may be applied to a specific instance: "A user accessing a resource within a compliance boundary of type X must be a member of the group Project Group 1 of the secured resource or else no rights shall be granted." The policy rule is an example of one type of policy rule that may be implemented for the secured resource 320. Other types of policy rules may be defined for other implementations, and more than one policy rule may be implemented for the secured resource 320. The policy rules may be defined by an owner or administrator of the secured resource 320.

The policy engine 305 may perform an operation 545 of determining whether the user has the rights required to perform the request 505 on the secured resource 320. The policy engine 305 may compare the transformed user effective rights obtained from operation 540) with the request 505 to determine whether the user has the rights required for the request 505 to be performed on the secured resource 320. If the user does not have the require rights for the request 505 to be performed, the policy engine 305 may proceed to the operation 550) discussed above to notify the user device 330 that the request 505 may not be performed. Otherwise, if the user has the rights required for the request 505 to be performed on the secured resource 320, the policy engine 305 may provide the request 505 to the secured resource 320 for execution. The secured resource 320 may execute the request and provide a request response 575 to the user device 330. The request response 515 may include an indication that the request was performed on the secured resource 320, an indication whether the request was completed successfully, and/or information obtained from the request performed on the secured resource 320. The information included in the request response may depend, at least in part, on the type of request 505 that was submitted to the secured resource server 370).

Figure 7:
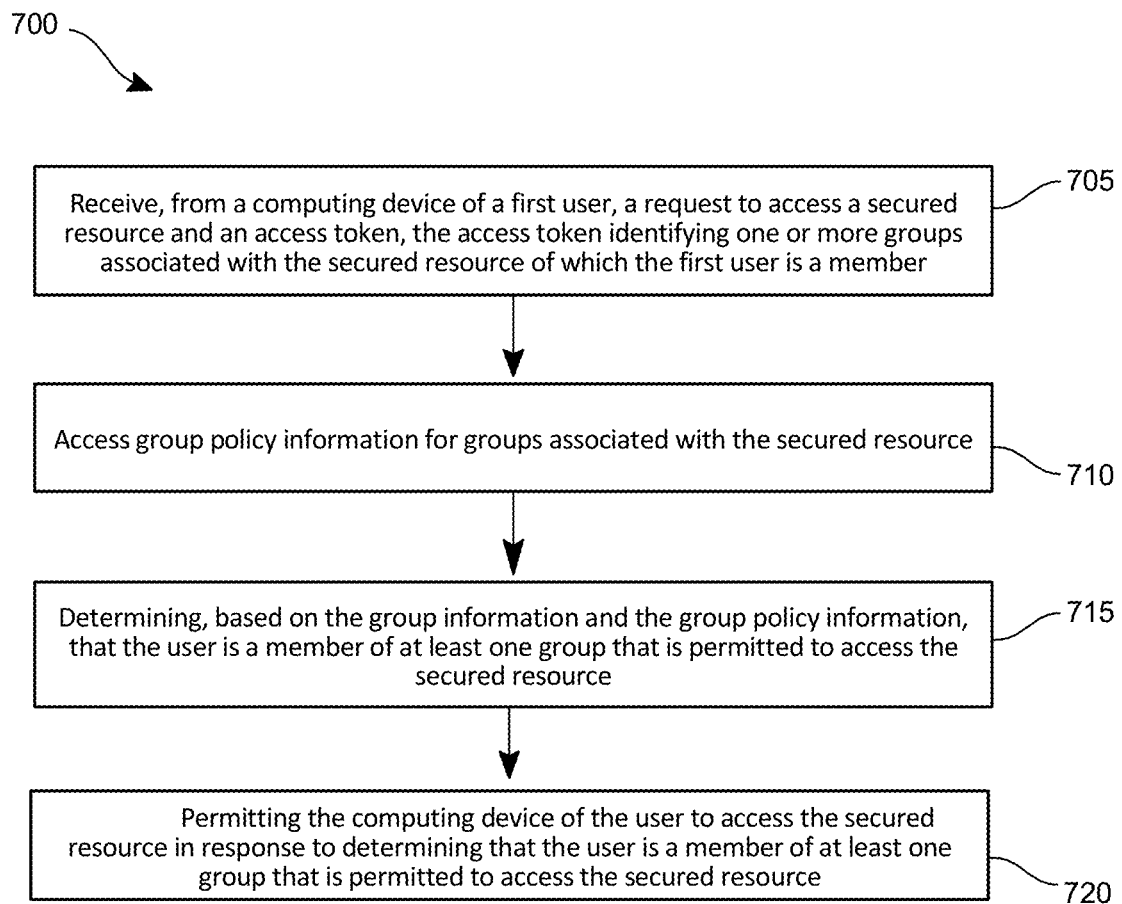
FIG. 7 is a flow chart of an example process for controlling data access to a secured resource of a distributed system.

FIG. 7 is a flow chart of an example process 700 for controlling data access to a secured resource of a distributed system as presented herein. The process 700 may be implemented by a secured resource server, such as the secured resource server 370) discussed in the preceding examples.

The process 700 may include an operation 705 of receiving, from a user device of a first user, a request to access a secured resource and a security token, the security token including group information for one or more access control groups of which the first user is a member, the access control groups being associated with the secured resource. As discussed in the preceding examples, the user device 330 may send a request 405 and token 410 to the secured resource server 370 to perform an action or actions on the secured resource 320.

The process 700 may include an operation 710 of accessing group access policy information for access control groups associated with the secured resource. The policy engine 305 of the secured resource server 370 may query the group access policy information datastore 310 to obtain the group access policy information for the secured resource 320. The group access policy information may include a group identifier for each access control group associated with the secured resource 320 and an indication whether members of the group have been granted access to the secured resource 320. The access control policy information may identify one or more access control groups associated with the secured resource that have been granted access to the secured resource. Membership in such an access control group indicates that a user is permitted to access the secured resource. However, membership in such an access control group is independent from access control information associated with the user and indicative of how the user may interact with the secured resource upon accessing the secured resource. As discussed in the preceding examples, such rights may be determined through ACL-based rights associated with the secured resource 120 as a whole and/or ACL-based rights associated with individual objects of the secured resource.

The process 700 may include an operation 715 of determining, based on the group information included in the token and the group access policy information, that the first user is a member of at least one access control group that is permitted to access the secured resource 320. The policy engine 305 may be configured to obtain the identifiers of the access control group or groups of which the user is a member from the token 410. The policy engine 305 may compare these identifiers with the identifiers of the access control groups included in the group access policy to determine whether at least one of the access control groups identified in the token 410 have been granted access to the secured resource 320.

The process 700 may include an operation 720 of permitting the computing device of the user to access the secured resource responsive to determining that the first user is a member of at least one group that is permitted to access the secured resource. As discussed in the preceding examples, the policy engine 305 may be configured to permit the user device 330 to access the secured resource 320 responsive to the user being a member of an access control group that has been granted access to the secured resource 320. Otherwise, the policy engine 305 may deny the request received from the user device 330 to perform one or more actions on the secured resource 320. The policy engine 305 may also perform additional ACL-based checks to determine whether the user has the rights required for the requested action to be performed on the secured resource 320.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein. "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
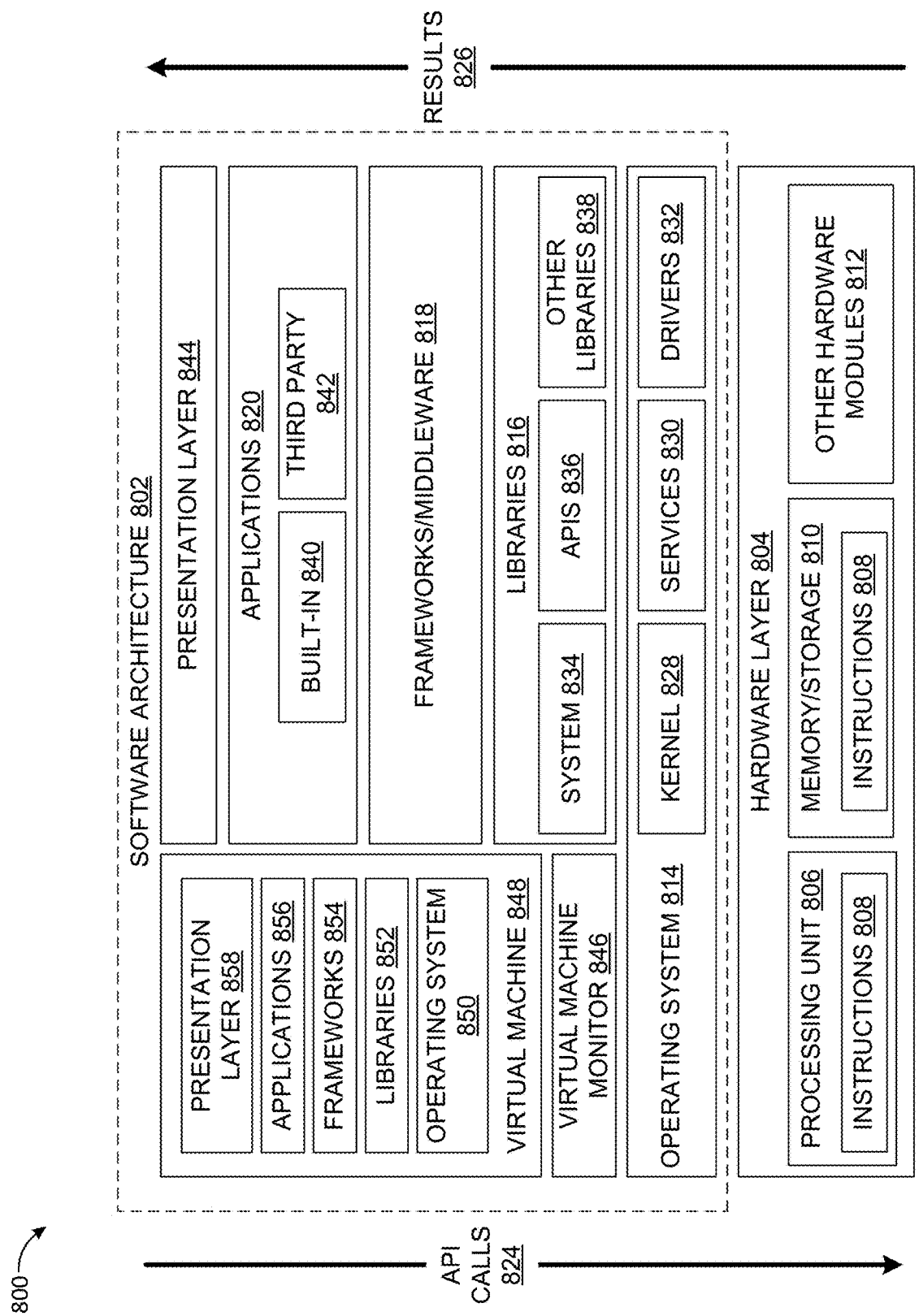
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example. WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820) may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
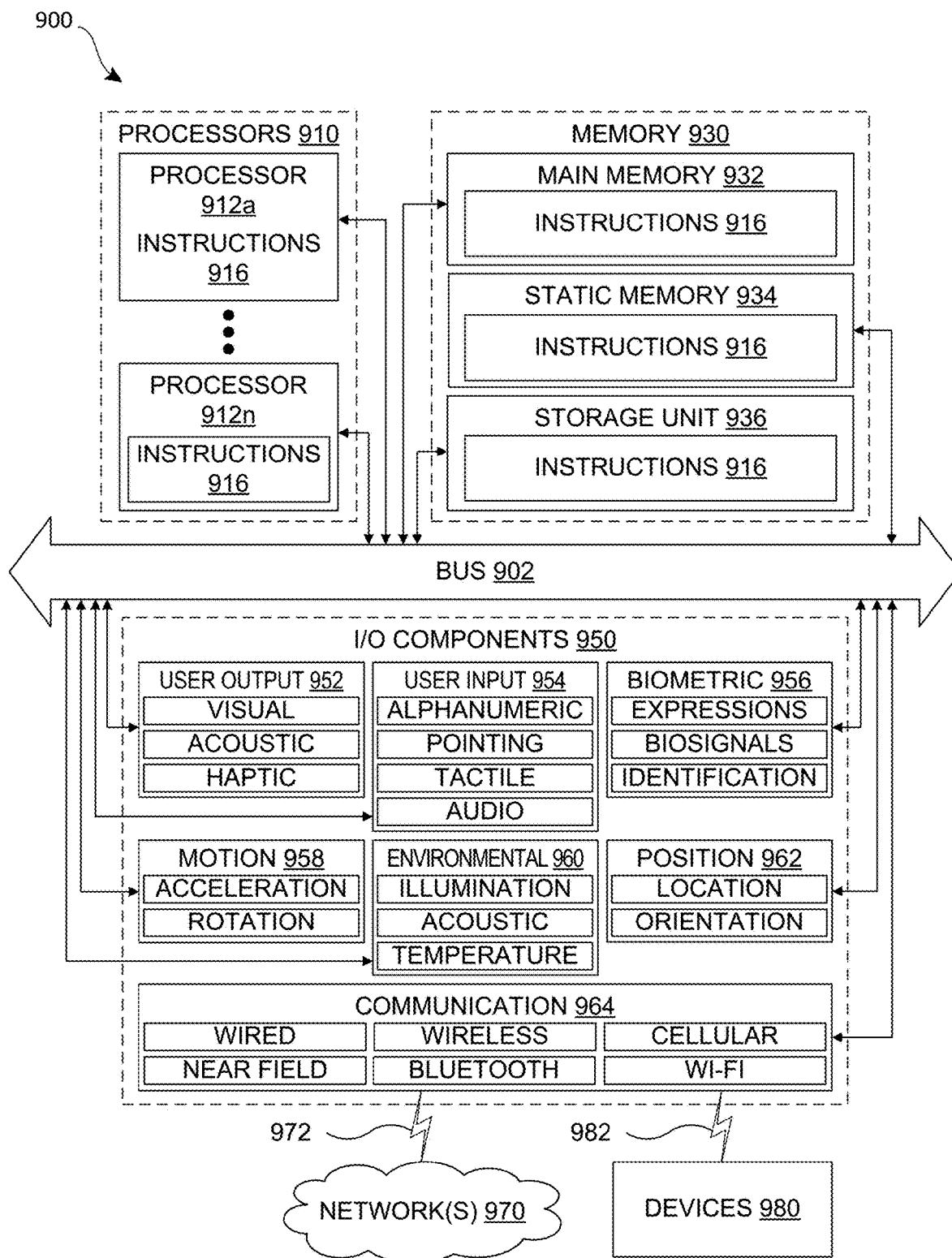
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a hardware processor; and
   a machine-readable storage medium storing executable instructions that, when executed, cause the processor to perform operations comprising:
   receiving, from a first user device of a first user associated with a first organization, a first request to access a secured resource managed for the first organization on a distributed system configured to manage resources for a plurality of organizations, the first request further comprising a first security token, the first security token including group information for a first access control group associated with the secured resource of which the first user is a member;
   accessing group access policy information for access control groups associated with the secured resource, each access control group comprising a subset of users associated with the first organization, the group access policy information identifying one or more access control groups associated with the secured resource, membership in an access control group indicating that a user of the distributed system is permitted to access the secured resource, and membership in the access control group being independent from limitations on how the user is permitted to interact with the secured resource upon accessing the secured resource and independent from permission to access to other secured resources on the distributed system; and
   determining, based on the group information included in the first security token and the group access policy information, that the first user is a member of the first access control group that is permitted to access the secured resource; and, in response,
      accessing an access control list (ACL) that indicates which actions the first user is permitted to perform on the secured resource responsive to permitting the first user device of the first user to access the secured resource,
      determining whether the first user is permitted to perform a first action on the secured resource by comparing access control entries in the ACL for the first user as to which actions the first user is permitted to perform with each of claims obtained from the first security token asserted by the first user to determine transformed user effective rights for the first user, wherein the transformed user effective rights represent a union of rights for access to the secured resource determined from the ACL associated with the first user that have corresponding claims in a list of claims from e first security token of the first user; and, in response,
      permitting the first user device of the first user to access the secured resource in response to the user being a member of the first access control group, and
      permitting the first user device of the first user to perform the first action included in the request based on the ACL.

2. The data processing system of claim 1, wherein the machine-readable storage medium includes instructions configured to cause the processor to perform operations of:
   receiving, from a second user device of a second user that is an owner or administrator of the secured resource, a set group access policy request comprising an indication that access to the secured resource by the first access control group is revoked; and
   updating the group access policy information to indicate that the one or more first access control groups do not have access to the secured resource.

3. The data processing system of claim 2, wherein the machine-readable storage medium includes instructions configured to cause the processor to perform operations of:
   receiving, from the first user device of the first user, a second request to access the secured resource and the first security token;
   determining, based on the group information included in the first security token and the group access policy information, that the first user is not a member of at least one access control group that is permitted to access the secured resource; and, in response,
   denying the first user device of the first user access to the secured resource.

4. The data processing system of claim 1, wherein the machine-readable storage medium includes instructions configured to cause the processor to perform operations of:
   receiving, from a second user device of a second user that is an owner or administrator of the secured resource, a set group membership request comprising an indication that the first user is to be removed from the one or more first access control groups; and updating group membership information to indicate that the first user is not a member of the first access control group.

5. The data processing system of claim 4, wherein the machine-readable storage medium includes instructions configured to cause the processor to perform operations of:
receiving, from the first user device of the first user, a second request to access the secured resource and a second security token, the second security token including updated group membership information for the first user;
determining, based on the group information included in the second security token and the group access policy information, that the first user is a not member of at least one access control group that is permitted to access the secured resource; and, in response,
denying the first user device of the first user access to the secured resource.

6. The data processing system of claim 1, wherein the secured resource includes collaborative content, shared executable resources, or both.

7. The data processing system of claim 1, wherein the machine-readable storage medium includes instructions configured to cause the processor to perform operations of transforming the user effective rights with a transform function applied to a combination of the user effective rights and policy rules representing a declarative expression an owner or administrator of the secured resource to generate transformed user effective rights, and only permitting the first user device of the first user to perform the first action if performing the first action is permitted by the transformed user effective rights.

8. A method implemented in a data processing system for controlling data access to a secured resource of a distributed system, the method comprising:
receiving, from a first user device of a first user associated with a first organization, a first request to access a secured resource managed for the first organization on a distributed system configured to manage resources for a plurality of organizations, the first request further comprising a first security token, the first security token including group information for a first access control group associated with the secured resource of which the first user is a member;
accessing group access policy information for access control groups associated with the secured resource, each access control group comprising a subset of users associated with the first organization, the group access policy information identifying one or more access control groups associated with the secured resource, membership in an access control group indicating that a user of the distributed system is permitted to access the secured resource, and membership in the access control group being independent from limitations on how the user is permitted to interact with the secured resource upon accessing the secured resource and independent from permission to access to other secured resources on the distributed system; and
determining, based on the group information included in the first security token and the group access policy information, that the first user is a member of the first access control group that is permitted to access the secured resource; and, in response,
accessing an access control list (ACL) that indicates which actions the first user is permitted to perform on the secured resource responsive to permitting the first user device of the first user to access the secured resource,
determining whether the first user is permitted to perform a first action on the secured resource by comparing access control entries in the ACL for the first user as to which actions the first user is permitted to perform with each of claims obtained from the first security token asserted by the first user to determine transformed user effective rights for the first user, wherein the transformed user effective rights represent a union of rights for access to the secured resource determined from the ACL associated with the first user that have corresponding claims in a list of claims from the first security token of the first user; and, in response,
permitting the first user device of the first user to access the secured resource in response to the user being a member of the first access control group, and
permitting the first user device of the first user to perform the first action included in the request based on the ACL.

9. The method of claim 8, further comprising:
receiving, from a second user device of a second user that is an owner or administrator of the secured resource, a set group access policy request comprising an indication that access to the secured resource by the one or more first access control groups is revoked; and
updating the group access policy information to indicate that the one or more first access control groups do not have access to the secured resource.

10. The method of claim 9, further comprising:
receiving, from the first user device of the first user, a second request to access the secured resource and the first security token;
determining, based on the group information included in the first security token and the group access policy information, that the first user is not a member of at least one group that is permitted to access the secured resource; and, in response,
denying the first user device of the first user access to the secured resource.

11. The method of claim 8, further comprising:
receiving, from a second user device of a second user that is an owner or administrator of the secured resource, a set group membership request comprising an indication that the first user is to be removed from the one or more first access control groups; and
updating group membership information to indicate that the first user is not a member of the one or more first access control groups.

12. The method of claim 11, further comprising:
receiving, from the first user device of the first user, a second request to access the secured resource and a second security token, the second security token including updated group membership information for the first user;
determining, based on the group information included in the second security token and the group access policy information, that the first user is a not member of at least one group that is permitted to access the secured resource; and, in response,
denying the first user device of the first user access to the secured resource.

13. The method of claim 8, wherein the secured resource includes collaborative content, shared executable resources, or both.

14. The method of claim 8, further comprising transforming the user effective rights with a transform function applied to a combination of the user effective rights and policy rules representing a declarative expression an owner or administrator of the secured resource to generate transformed user effective rights, and only permitting the first user device of the first user to perform the first action if performing the first action is permitted by the transformed user effective rights.

15. A machine-readable storage device on which are stored instructions that, when executed, cause a hardware processor of a programmable device to perform operations of:
receiving, from a first user device of a first user associated with a first organization, a first request to access a secured resource managed for the first organization on a distributed system configured to manage resources for a plurality of organizations, the first request further comprising a first security token, the first security token including group information for a first access control group associated with the secured resource of which the first user is a member;
accessing group access policy information for access control groups associated with the secured resource, each access control group comprising a subset of users associated with the first organization, the group access policy information identifying one or more access control groups associated with the secured resource, membership in an access control group indicating that a user of the distributed system is permitted to access the secured resource, and membership in the access control group being independent from limitations on how the user is permitted to interact with the secured resource upon accessing the secured resource and independent from permission to access to other secured resources on the distributed system; and
determining, based on the group information included in the first security token and the group access policy information, that the first user is a member of the first access control group that is permitted to access the secured resource; and in response,
accessing an access control list (ACL) that indicates which actions the first user is permitted to perform on the secured resource responsive to permitting the first user device of the first user to access the secured resource,
determining whether the first user is permitted to perform a first action on the secured resource by comparing access control entries in the ACL for the first user as to which actions the first user is permitted to perform with each of claims obtained from the first security token asserted by the first user to determine transformed user effective rights for the first user, wherein the transformed user effective rights represent a union of rights for access to the secured resource determined from the ACL associated with the first user that have corresponding claims in a list of claims from the first security token of the first user; and, in response,
permitting the first user device of the first user to access the secured resource in response to the user being a member of the first access control group, and
permitting the first user device of the first user to perform the first action included in the request based on the ACL.

16. The machine-readable storage device of claim 15, wherein the machine-readable storage device includes instructions configured to cause the processor to perform operations of:
receiving, from a second user device of a second user that is an owner or administrator of the secured resource, a set group access policy request comprising an indication that access to the secured resource by the first access control group is revoked; and
updating the group access policy information to indicate that the one or more first access control groups do not have access to the secured resource.

17. The machine-readable storage device of claim 16, wherein the machine-readable storage device includes instructions configured to cause the processor to perform operations of:
receiving, from the first user device of the first user, a second request to access the secured resource and the first security token;
determining, based on the group information included in the first security token and the group access policy information, that the first user is not a member of at least one group that is permitted to access the secured resource; and in response,
denying the first user device of the first user access to the secured resource.

18. The machine-readable storage device of claim 15, wherein the machine-readable storage device includes instructions configured to cause the processor to perform operations of:
receiving, from a second user device of a second user that is an owner or administrator of the secured resource, a set group membership request comprising an indication that the first user is to be removed from the first access control group; and
updating group membership information to indicate that the first user is not a member of the first access control group.

19. The machine-readable storage device of claim 18, wherein the machine-readable storage device includes instructions configured to cause the processor to perform operations of:
receiving, from the first user device of the first user, a second request to access the secured resource and a second security token, the second security token including updated group membership information for the first user;
determining, based on the group information included in the second security token and the group access policy information, that the first user is a not member of at least one group that is permitted to access the secured resource; and in response,
denying the first user device of the first user access to the secured resource.

20. The machine-readable storage device of claim 15, wherein the machine-readable storage device includes instructions configured to cause the processor to perform operations of: transforming the user effective rights with a transform function applied to a combination of the user effective rights and policy rules representing a declarative expression an owner or administrator of the secured resource to generate transformed user effective rights, and only permitting the first user device of the first user to perform the first action if performing the first action is permitted by the transformed user effective rights.

* * * * *